US011944855B2

(12) United States Patent
Sjödin et al.

(10) Patent No.: US 11,944,855 B2
(45) Date of Patent: Apr. 2, 2024

(54) FIRE EXTINGUISHING ASSISTANCE SYSTEM AND A METHOD FOR ASSISTING IN EXTINGUISHING AN ONGOING OR IMMINENT FIRE IN A MODULAR VEHICLE

(71) Applicant: Scania CV AB, Södertälje (SE)

(72) Inventors: Robert Sjödin, Nyköping (SE); Pontus Svens, Rönninge (SE); Morgan Colling, Hölö (SE); Sami Teppola, Nykvarn (SE); Mikko Kallio, Hölö (SE); Tomas Skeppström, Södertälje (SE); Linus Ährlig, Västerhaninge (SE); André Claesson, Tullinge (SE)

(73) Assignee: Scania CV AB, Södertälje (SE)

( * ) Notice: Subject to any disclaimer, the term of this patent is extended or adjusted under 35 U.S.C. 154(b) by 486 days.

(21) Appl. No.: 17/311,875

(22) PCT Filed: Nov. 25, 2019

(86) PCT No.: PCT/SE2019/051191
§ 371 (c)(1),
(2) Date: Jun. 8, 2021

(87) PCT Pub. No.: WO2020/130906
PCT Pub. Date: Jun. 25, 2020

(65) Prior Publication Data

US 2022/0016457 A1 Jan. 20, 2022

(30) Foreign Application Priority Data

Dec. 20, 2018 (SE) .................................... 1851626-0

(51) Int. Cl.

| | |
|---|---|
| ***A62C 3/07*** | (2006.01) |
| ***A62C 3/16*** | (2006.01) |
| ***A62C 37/38*** | (2006.01) |

(52) U.S. Cl.
CPC ................ *A62C 3/07* (2013.01); *A62C 37/38* (2013.01); *A62C 3/16* (2013.01)

(58) Field of Classification Search
CPC .... A62C 3/07; A62C 3/08; A62C 3/10; A62C 3/16; A62C 37/36; A62C 37/38; A62C 37/40; A62C 37/44
(Continued)

(56) References Cited

U.S. PATENT DOCUMENTS

| | | | |
|---|---|---|---|
| 5,154,238 | A | 10/1992 | Buchan |
| 2007/0221430 | A1 | 9/2007 | Allison |

(Continued)

FOREIGN PATENT DOCUMENTS

| | | | |
|---|---|---|---|
| DE | 102012018051 | A1 | 3/2014 |
| DE | 102014011609 | A1 | 3/2015 |

(Continued)

OTHER PUBLICATIONS

Scania CV AB, European Patent Application No. 19898141.7, Extended European Search Report, dated Aug. 12, 2022.

(Continued)

*Primary Examiner* — Darren W Gorman
(74) *Attorney, Agent, or Firm* — Moore & Van Allen PLLC; W. Kevin Ransom

(57) ABSTRACT

A fire extinguishing assistance system arranged in a modular vehicle, for assisting e.g. a fire extinguishing vehicle in extinguishing an ongoing or imminent fire in the modular vehicle. The modular vehicle comprises at least one drive module and a functional module that are releasably connected. The system comprises a plurality of ports accessible from the outside of the modular vehicle; wherein each port is configured for receiving a fire extinguishing agent from e.g. the fire extinguishing vehicle. The system also comprises an individual manifold connected to each port,
(Continued)

wherein each is arranged to guide the fire extinguishing agent to at least one nozzle directed inside of the modular vehicle. The system further comprises a control device to detect an ongoing or imminent fire and configure at least one of the plurality of ports selected for receiving a fire extinguishing agent to assist in suppressing the ongoing or imminent fire.

26 Claims, 4 Drawing Sheets

(58) Field of Classification Search
USPC ............................................................ 169/62
See application file for complete search history.

(56) References Cited

U.S. PATENT DOCUMENTS

| | | | | |
|---|---|---|---|---|
| 2009/0205846 | A1* | 8/2009 | Zeweke | A62C 3/07 169/45 |
| 2016/0206905 | A1* | 7/2016 | Burgess | A62C 35/68 |
| 2016/0346573 | A1 | 12/2016 | Carson et al. | |
| 2020/0129795 | A1* | 4/2020 | Ku | A62C 3/07 |
| 2021/0331011 | A1* | 10/2021 | Geissler | B60L 50/64 |

FOREIGN PATENT DOCUMENTS

| | | | |
|---|---|---|---|
| EP | 2711052 | A1 | 3/2014 |
| FR | 3002910 | A1 | 9/2014 |
| GB | 2215204 | A | 9/1989 |
| WO | 2015031952 | A1 | 3/2015 |
| WO | 2018222375 | A1 | 12/2018 |

OTHER PUBLICATIONS

Scania CV AB, Brazilian Patent Application No. BR112021008964-0, Preliminary Office Action, dated Aug. 15, 2023.
Scania CV AB, International Patent Application No. PCT/SE2019/051191, International Preliminary Report on Patentability, dated Jun. 16, 2021.
Scania CV AB, International Patent Application No. PCT/SE2019/051191, International Search Report, dated Jan. 22, 2020.
Scania CV AB, International Patent Application No. PCT/SE2019/051191, Written Opinion, dated Jan. 22, 2020.

* cited by examiner

FIRE EXTINGUISHING ASSISTANCE SYSTEM AND A METHOD FOR ASSISTING IN EXTINGUISHING AN ONGOING OR IMMINENT FIRE IN A MODULAR VEHICLE

CROSS-REFERENCE TO RELATED APPLICATIONS

This application is a National Stage Patent Application (filed under 35 § U.S.C. 371) of PCT/SE2019/051191, filed Nov. 25, 2019 of the same title, which, in turn claims priority to Swedish Patent Application No. 1851626-0 filed Dec. 20, 2018 of the same title; the contents of each of which are hereby incorporated by reference.

FIELD OF THE INVENTION

The present disclosure relates to techniques in the context of vehicles, and to a fire extinguishing assistance system, a modular vehicle comprising the fire extinguishing assistance system, and a method for assisting in extinguishing an ongoing or imminent fire in a modular vehicle. The disclosure also relates to a computer program for performing the proposed method, and a computer program product comprising the computer program.

BACKGROUND

Vehicles of today may comprise various kinds of energy storages, such as gas and batteries. If a failure or accident occurs, the batteries may become overheated and catch fire. The fire often starts deep inside the vehicle and may therefore be difficult to access and extinguish.

It is desired to suppress such fires rapidly before they spread, and a solution to this problem is found in US20160346573A1. This document describes a lithium energy storage fire suppression water hose system, comprising a manifold that distributes fire suppressing material to various parts in a bus. The manifold is accessible via two ports located on an exterior of the bus. The ports may be closed with a flap or a lid that can be opened from the outside. When a fire fighter reaches the vehicle, the fire fighter will then attach a fire hose to one port. In a final step, the fire fighter will apply a fire fighting extinguishing agent into the access port.

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle may be used for the specific purpose. Thus, a bus may be used as a bus and a garbage truck may be used as a garbage truck. Different vehicles are thus needed for different purposes, which may require a large fleet of vehicles and which may be very costly.

One way of achieving flexibility is to develop modular vehicles which may be assembled and disassembled easily and in a short period of time, e.g. for a certain mission. However, one challenge associated with such vehicles is how to handle fires or imminent fires in the modular vehicles, as the vehicles often are re-assembled for each mission.

SUMMARY OF THE INVENTION

It is an object of the disclosure to alleviate at least some of the drawbacks with the prior art. Thus, it is an object to provide a solution that gives support for achieving efficient suppression of fire or imminent fire in a modular vehicle.

According to a first aspect, the disclosure relates to a fire extinguishing assistance system, arranged in a modular vehicle, for assisting in extinguishing an ongoing or imminent fire in the modular vehicle. The modular vehicle comprises at least one drive module and a functional module that are releasably connected. The fire extinguishing assistance system comprises a plurality of ports accessible from the outside of the modular vehicle. Each port is configured for receiving a fire extinguishing agent. The system also comprises an individual manifold connected to each port. Furthermore, each individual manifold is arranged to guide the fire extinguishing agent received via the port and further to at least one nozzle directed in the inside of the modular vehicle. The system also comprises a control device configured to detect an ongoing or imminent fire in the vehicle and configure at least one of the plurality of ports selected for receiving a fire extinguishing agent to the ongoing or imminent fire, to assist in extinguishing the ongoing or imminent fire.

By having a plurality of ports each connected to an individual manifold, it is facilitated to distinguish and select one of the ports to be most suitable for receiving a fire extinguishing agent to the ongoing or imminent fire. The control unit may configure the selected port e.g. to open. Thereby it can be ensured that the detected fire or imminent fire is suppressed or extinguished correctly.

In some embodiments, a first port of the plurality of ports is arranged in a first drive module of the at least one drive modules. In some embodiments, a second port of the plurality of ports is arranged in a second drive module of the at least one drive modules. In some embodiments, a third port of the plurality of ports is arranged in the functional module. Thus, the modules may be arranged with individual ports, and then each module, irrespective of which other module it is connected to, will comprise its own fire extinguishing assistance system.

In some embodiments, the control device is configured to detect an ongoing or imminent fire upon at least one detected fire related property meets one or several fire criteria. Thereby, a fire or imminent fire may be detected before it becomes too difficult to extinguish.

In some embodiments, the fire-related properties are one or several of: heat, smoke, smoke particles and gas. Thus, a fire or imminent fire may be detected in a plurality of ways.

In some embodiments, the control device is configured to determine a location in the vehicle related to the ongoing or imminent fire, and to select a port of the plurality of ports for receiving a fire extinguishing agent to the ongoing fire, as being a port that is connected to at least one manifold that includes the shortest distance to the determined location. For example, the location may be the location of a detector from which fire related properties that were used to detect the fire or imminent fire. A predetermined scheme may be used that points out which port to use dependent on the location of the detector. Thus, an efficient suppressing of the fire or imminent fire may be obtained.

In some embodiments, the system comprises a plurality of valve device configured to selectively allow, and disallow, passage of a fire extinguishing agent in one or several of the manifolds. The control device is configured to control the plurality of valve devices such that fire extinguishing agent can be passed from the port selected for receiving a fire extinguishing agent, to the location related to the ongoing or imminent fire. For example, different ports may be used to receive an agent being intended for the same location in the modular vehicle. Thereby, if one of the ports is damaged, another port may be used instead, and the agent may be routed by means of the valve devices to the location. Thereby, a more robust and stable fire extinguishing can be achieved, and safety in increased.

In some embodiments, the system comprises a plurality of module connection ports arranged in the modules for connecting manifolds of the individual modules. Thereby, manifolds of different modules can connect with each other in order to pass agent between the manifolds.

In some embodiments, each port comprises a port mechanism arranged to selectively open and close the port. The control device is configured to configure the port selected for receiving a fire extinguishing agent to the ongoing or imminent fire by controlling the port mechanism to open the port. Thereby, the port opening is accessible for passing an agent therethrough.

In some embodiments, each port comprises at least one indication device configured to indicate the port visually and/or audially. The control device is configured to configure the port selected for receiving a fire extinguishing agent to the ongoing or imminent fire by indicating with the at least one indication device of said port. Thereby, the selected port can be more easily found, e.g. detection of the selected port is facilitated.

In some embodiments, each port comprises a locking interface for locking a fire hose interface to the port. Thereby, the fire hose can be secured to the port while passing an agent into the port opening.

In some embodiments, the at least one nozzle is directed to an energy storage, an electric motor and/or a braking system. Thereby, the agent can reach the parts that catch fire most frequently.

In some embodiments, the control device is configured to send a fire alarm notification to a fire extinguishing vehicle or an off-board system, wherein the fire alarm notification comprises information identifying the modular vehicle. Thereby, the location of the modular vehicle may be determined, and the fire extinguishing vehicle can drive to the modular vehicle to extinguish the fire.

In some embodiments, the control device is configured to send information of the ongoing or imminent fire and/or information indicative of a position of the modular vehicle to a fire extinguishing vehicle or an off-board system. For example, the modular vehicle may send information to the fire extinguishing vehicle using short range communication, when the modular vehicle and the fire extinguishing vehicle are close to each other. The information may be used to determine what kind of agent to use, and where to find the modular vehicle.

According to a second aspect, the disclosure relates to a modular vehicle comprising at least one driving module and a functional module that are releasably connected, wherein the modular vehicle comprises a fire extinguishing assistance system according to the first aspect.

According to a third aspect, the disclosure relates to a method, performed in a modular vehicle, for assisting in extinguishing an ongoing or imminent fire in the modular vehicle. The modular vehicle comprises at least one drive module and a functional module that are releasably connected, and a fire extinguishing assistance system. The system comprises a plurality of ports accessible from the outside of the modular vehicle, wherein each port is configured for receiving a fire extinguishing agent. The system also comprises an individual manifold connected to each port, wherein each individual manifold is arranged to guide the fire extinguishing agent received via the port and further to at least one nozzle directed in the inside of the modular vehicle. The method comprises: detecting an ongoing fire in the vehicle and configuring at least one of the plurality of ports selected for receiving a fire extinguishing agent to the ongoing or imminent fire, to assist in extinguishing the ongoing or imminent fire. The same effects as with the system may be achieved with the method.

According to a fourth aspect, the disclosure relates to a computer program comprising instructions which, when the program is executed by a control device, cause the control device to carry out the method according to the third aspect.

According to a fifth aspect, the disclosure relates to a computer-readable storage medium comprising instructions which, when executed by a control device, cause the control device to carry out the method according to the third aspect.

DETAILED DESCRIPTION OF THE INVENTION

A modular vehicle is herein defined to be a vehicle that comprises at least one drive module and a functional module that are releasably connected. The modular vehicle may be put together from different modules from time to time, to fit different transport missions. The modular vehicle is typically autonomous and may thus be driver-less. The modular vehicle is for example electrically propelled, and then comprises one or several electrical motors and at least one energy storage such as a battery. As the modular vehicle is put together from different modules, the location of e.g. the energy storage or storages may differ from vehicle to vehicle. When a fire or imminent fire is detected in the modular vehicle, it might not be obvious for a fire fighter or similar how to suppress the fire or imminent fire in an efficient way, as the fire fighter might not know where the fire started or where energy storages and other vulnerable parts are located in the vehicle.

The disclosure proposes a fire extinguishing assistance system, arranged in a modular vehicle, for assisting e.g. a fire extinguishing vehicle in extinguishing an ongoing or imminent fire in the modular vehicle. The fire extinguishing assistance system comprises a plurality of ports for receiving fire extinguishing agent from e.g. the fire extinguishing vehicle, a fireplug or other source of agent. The ports are arranged in sidewalls of the modular vehicle. Each port is connected to an individual manifold that is arranged to guide the agent to a location in the vehicle, e.g. a location close to an energy storage, the propulsion system such as motor, or brakes. By configuring a selected port, e.g. opening a lid and/or highlighting the port, the fire fighter and/or the fire extinguishing vehicle can be guided to the port and pass the agent into the selected port. The selected port is for example selected to be suitable for receiving the agent, as the port is located on the same module that is on fire or imminent fire, or the port gives the shortest way via manifolds to the fire or imminent fire. Thereby, the fire or imminent fire may be suppressed in an efficient way and the damages minimized.

Before the fire extinguishing assistance system and adherent methods are further explained, an example of a modular vehicle, and assembling of such a vehicle, will be described. The modular vehicles described herein are typically configured to operate autonomously.

Figure 1:
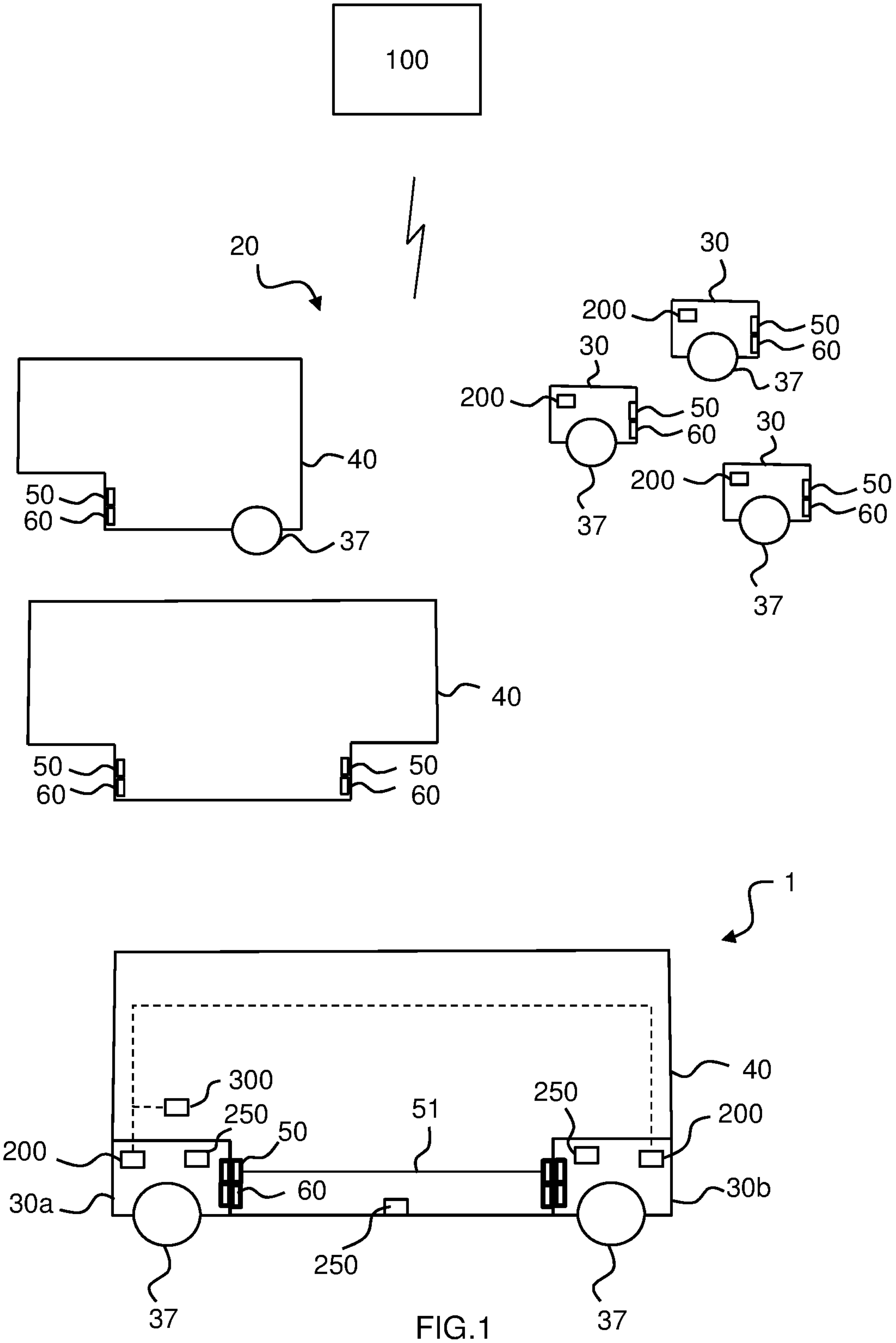
FIG. 1 illustrates a set of modules, a vehicle assembled from the set of modules, and an offboard system.

FIG. 1 illustrates an example set of modules 20 for assembling a vehicle 1. An offboard system and an example of an assembled vehicle 1 is also illustrated. The set of modules 20 comprises a plurality of drive modules 30 and a plurality of functional modules 40. The drive modules' 30 main function is typically to drive (e.g. propel, steer and brake) a vehicle 1. The drive modules 30 comprises a pair of wheels 37 and are configured to be autonomously operated. The functional modules 40 are configured to perform a certain function such as to carry a load, e.g. goods or people.

Each module 30, 40 in the set of modules 20 comprises at least one interface 50 releasably connectable to a corresponding interface 50 on another module 30, 40. Since the drive module 30 may be configured to be operated as an independently driven unit by means of the control device 200, the drive module may 30 be connected with, or disconnected from, the functional module 40 without manual work.

An example of a sequence for assembly of a vehicle 1 will be described below. An operator may receive a mission from a client to transport goods from one location to another. The operator enters the information about the mission into the control device 100 of the off-board system via a user interface, such as a touch screen or similar. It is pointed out that this is merely an example, and the received mission may automatically be translated and/or inputted to the control device 100. The control device 100 then determines which function to be performed and thus which type of vehicle 1 is required to complete the mission. In this example, the required vehicle 1 may be a truck. The control device 100 selects which modules 30, 40 to use for the required truck. The type of vehicle 1 and the modules 30, 40 required to complete the mission may for example be selected based on information about the goods, the distance to travel and/or the geographical location. The control device 100 then suitably converts the mission into a command for one or two selected drive modules 30 to physically and electrically connect with the selected functional module 40. The control devices 200 of the drive modules 30 each receives the command and converts the command to control signals for the respective drive module 30. The drive modules 30 are thereby controlled to physically and electrically connect with the functional module 40. Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the control devices 200 indicating that the connection(s) have been performed. Based on the signal from the at least one sensor device 60, the control device 200 in a drive module 30 may send a verification signal to the control device 100 for verification of the connection(s). The control device 100 may then generate a unique vehicle identity for the assembled vehicle 1. A vehicle 1 is thus assembled and the vehicle 1 is ready to perform the mission. The modular vehicle can easily be assembled and re-assembled e.g. to perform a certain mission. The present disclosure is applicable on all sorts of road vehicles. However, the disclosure may relate to heavy vehicles, such as buses, trucks etc. Specifically, the present disclosure may relate to vehicles for use on public roads.

By combining drive modules 30 and functional modules 40, different types of vehicles 1 can be achieved. Some vehicles 1 require two drive modules 30 and some vehicles 1 only require one drive module 30, depending on the structural configuration of the functional module 40. Each drive module 30 comprises a control device 200 and is configured to communicate with a control device 100 in a control center or off-board system. Each functional module 40 may comprises a control device 300 and may thus also communicate with a control device 100 in a control center or off-board system. Considering an assembled vehicle 1 comprises two drive modules, the control device 100 in the off-board system may appoint one drive module to be master drive module and the other to be slave drive module.

In some embodiments, the control device 200 of the drive module 30 is configured to communicate with the control device 300 of a functional module 40, as illustrated by dashed lines in FIG. 1. The communication between the modules 30, 40 may be wireless or conductively or by wire. The wireless communication may be directly between the modules or via the off-board system (i.e. comprising a control device 100). The modules 30, 40 of an assembled vehicle may communicate with each other and/or with the control device in the off-board system via 4G, 5G, V2V (Vehicle to Vehicle), Wi-Fi or any other wireless communication means.

In FIG. 1 the drive modules 30 are illustrated with only one interface 50, on one side of the drive module 30. However, it is to be understood that each drive module 30 may comprise a plurality of interfaces 50 for releasable connection with other modules 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40.

A drive module 30 comprises a sensor system 250 including a variety of sensors for perceiving the environment, navigate autonomously and avoid obstacles. For example, a drive module 30 may comprise a navigation unit (not shown), comprising a positioning unit using the Global Positioning System (GPS), in order to navigate between different positions. A functional module 40 may also comprise a sensor system 250 for perceiving the environment.

Figure 2:
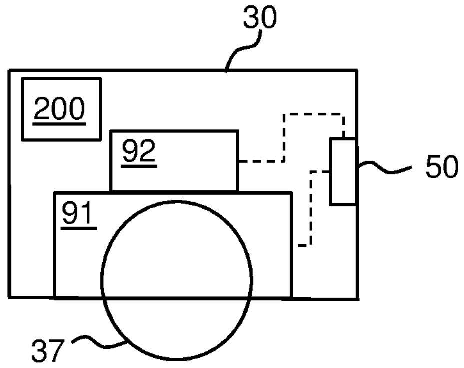
FIG. 2 schematically illustrates a drive module in further detail in a side view.

FIG. 2 schematically illustrates a drive module 30 in further detail in a side view. The drive module 30 comprises at least one (only one illustrated) propulsion system 91, an energy storage 92, an interface 50 and a control device 200. The energy storage 92 provides energy to the propulsion system 91. The propulsion system 91 comprises at least one electrical machine, thus an electrical motor. The propulsion system(s) 91 is/are arranged to propel the pair of wheels 37 of the drive module 30.

Figure 3:
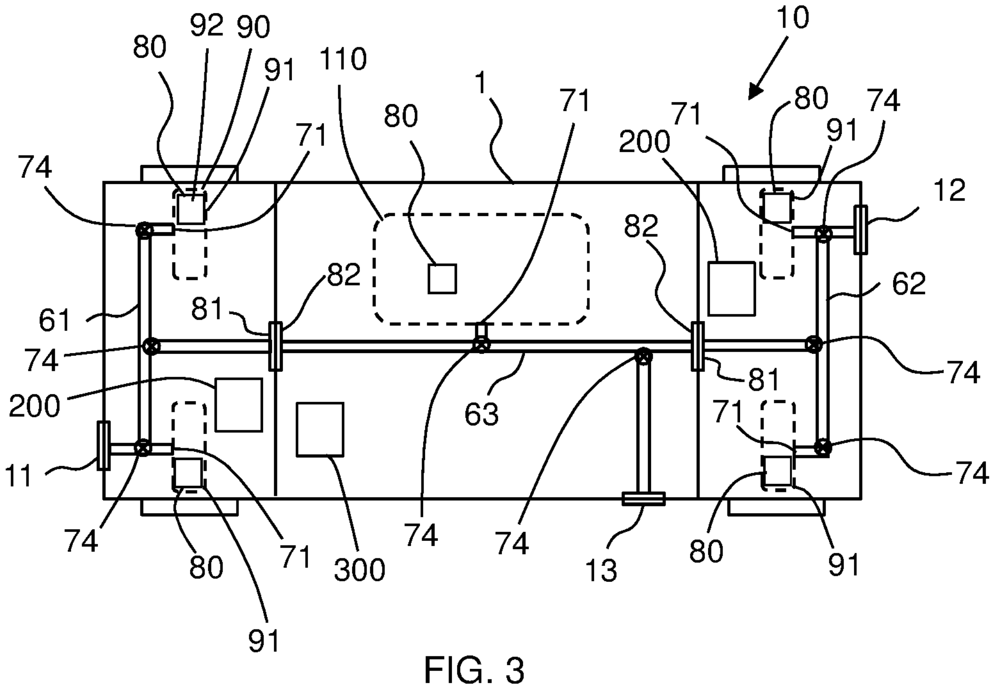
FIG. 3 illustrates a schematic horizontal cross-section of a modular vehicle, comprising a fire extinguishing assistance system according to the first aspect.

FIG. 3 illustrates a schematic horizontal cross-section of a modular vehicle, for example the assembled modular vehicle 1 illustrated in FIG. 1. In addition to what already explained in connection with FIG. 1, the functional module 40 comprises an energy storage 110, for providing extra energy to the drive modules 30. The vehicle 1 also comprises a fire extinguishing assistance system 10, that can be used for conducting fire extinguishing agent from an external source into the vehicle 1. The fire extinguishing assistance system 10 comprises a plurality of ports 11, 12, 13, an individual manifold 61, 62, 63 connected to each port 11, 12, 13 and at least one nozzle 71 connected to each individual manifold 61, 62, 63. The plurality of ports 11, 12, 13 are arranged at different locations in the vehicle 1, and all are accessible from the outside of the vehicle 1. In the example of FIG. 3, each module 30, 40 comprises one port. In more detail, a first port 11 is arranged in a first drive module 30*a*, a second port 12 is arranged in a second drive module 30*b*, and a third port 13 is arranged in the functional module 40. However, the vehicle 1 may comprise more or less ports than illustrated in the figures. The ports 11, 12, 13 are arranged in the sidewalls of the modules 30, 40.

Figure 5:
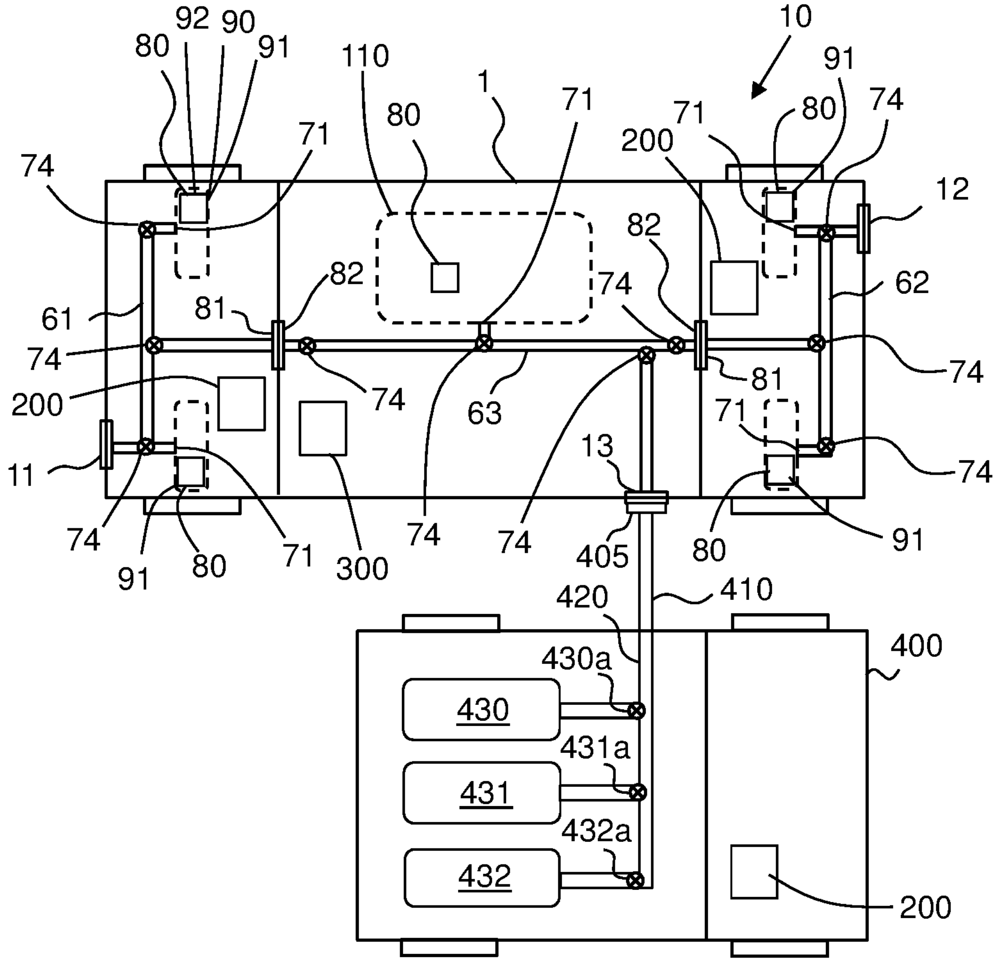
FIG. 5 illustrates the modular vehicle in FIG. 3, connected to a fire extinguishing vehicle.

Each port 11, 12, 13 is configured for receiving a fire extinguishing agent, e.g. from a fire extinguishing vehicle 400 (FIG. 5). An individual manifold 61, 62, 63 is fluidly connected to each port 11, 12, 13 inside the vehicle 1. A manifold 61, 62, 63 comprises pipes or fluid lines that are arranged to transport the agent. Each individual manifold 61, 62, 63 is arranged to guide the fire extinguishing agent received via the port 11, 12, 13 and further to at least one nozzle 71 directed in the inside of the modular vehicle 1. Typically, each module 30, 40 comprises at least one port 11, 12, 13 and one manifold 61, 62, 63 connected to the at least one port. At least one nozzle 71 is connected to each manifold 61, 62, 63. A nozzle 71 is typically directed to a part of the vehicle 1 that is suspected to catch fire, such as an energy storage 92, 110, one or several parts of the propulsion system 91 such as motor, e.g. an electrical motor, or a braking system 90. Alternatively, a nozzle 71 may be connected to a fluid system already present in the vehicle 1, such as a cooling system (not shown) of an energy storage or motor. An overpressure may then be built up in the cooling system, whereby the over pressure is released from the cooling system by the cooling system itself, e.g. via an over pressure valve (not shown). An overflow of agent may also be passed out from the vehicle 1 via the overpressure valve, such that new agent continuously can be passed via the nozzle to a location of the fire or imminent fire.

As previously explained, each module 30, 40 comprises a control device 200, 300. One or several of the control devices 200, 300 are configured to detect an ongoing or imminent fire in the vehicle 1. In the following it will be referred to only one control device 200, 300, but is should be understood that several control devices 200, 300 may act at the same time. The system 10 comprises a plurality of detectors 80 configured to detect fire related properties in the modular vehicle 1. The detectors 80 are for example located in the vicinity of the energy storages 92, 110, the propulsion system 91, the braking system 90 etc. A detector 80 is for example a temperature detector, a smoke detector, a camera and/or a gas detector. The detectors 80 are configured to detect or collect fire related properties such temperature, presence of smoke, smoke particles, gas, pictures of fire etc., and to send information about the properties to one or several of the control devices 200, 300. The one or several control devices 200, 300 are configured to receive the information from the detectors 80, and to detect an ongoing or imminent fire upon at least one detected fire related property meets one or several fire criteria. For example, if the temperature goes beyond a predetermined temperature threshold, e.g. an overheating threshold, it is determined that a fire is ongoing or imminent.

The control device 200, 300 is configured to select one or more ports 11, 12, 13 that are most suitable for passing an agent, in order to suppress the detected fire or imminent fire most efficiently. The selection is typically based on the location of the detected fire or imminent fire, and thus based on the location of the detector that detected the fire or imminent fire. For example, the control device 200, 300 includes a pre-determined scheme of which port to select, based on where the fire or imminent fire is located. In other words, a table or scheme mapping each location in the module to one or more suitable or compatible ports. For example, the pre-determined scheme may indicate which port 11, 12, 13 to select in order to have the shortest distance through the manifolds to the location. In one embodiment, the control device 200, 300 is configured to determine a location in the vehicle related to the ongoing or imminent fire, and to select a port of the plurality of ports 11, 12, 13 for receiving a fire extinguishing agent to the ongoing fire, as being a port 11, 12, 13 that is connected to at least one manifold 61, 62, 63 that includes the shortest distance to the determined location. In another embodiment, the control device 200, 300 is configured to select a port 11, 12, 13 that is located in the same module 30, 40 as where the fire or imminent fire is detected. In some situations, a port may be broken, damaged or not accessible. The control device 200, 300 may obtain such information via function checks, e.g. check if the ports are openable, or via other sensors in the vehicle, providing information if the vehicle is standing close to a wall or similar making a port inaccessible.

In order to direct agent in the manifolds to the location of the fire or imminent fire, the system 10 comprises a plurality of valve devices 74. The valve devices 74 are configured to selectively allow, or disallow, passage of a fire extinguishing agent in one or several of the manifolds 61, 62, 63. The control device 200, 300 is configured to control the plurality of valve devices 74 such that fire extinguishing agent can be passed from the port 11, 12, 13 selected for receiving a fire extinguishing agent, to the location related to the ongoing or imminent fire. Thus, the valve devices 74 comprises valves that can be actuated to close or open fluid passage in the manifolds. The valve devices 74 are connected to the control device 200, 300 such that the control device 200, 300 can control the valves to open or close fluid passage.

In some embodiments, a manifold of a module 30, 40 is connectable to a manifold of another module 30, 40. In order to connect the manifolds, the system 10 comprises a plurality of module connection ports 81, 82 arranged in the modules 20, 30. Thus, the ports 81, 82 are arranged for connecting manifolds 61, 62, 63 of the individual modules 30, 40. The module connection port 81, 82 is typically arranged on a side of the module 30, 40 facing another module 30, 40 when the modules are interconnected. The module connection ports 81, 82 may comprise a locking mechanism in order to lock the ports to each other to enable fluid transfer between the ports 81, 82 without leakage.

Upon an ongoing or imminent fire being detected, the one or several control devices 200, 300 is configured to configure at least one of the plurality of ports 11, 12, 13 selected for receiving a fire extinguishing agent to the ongoing or imminent fire, to assist in suppressing the fire. The selected at least one port 11, 12, 13 may be configured in a plurality of ways.

Figure 4A:
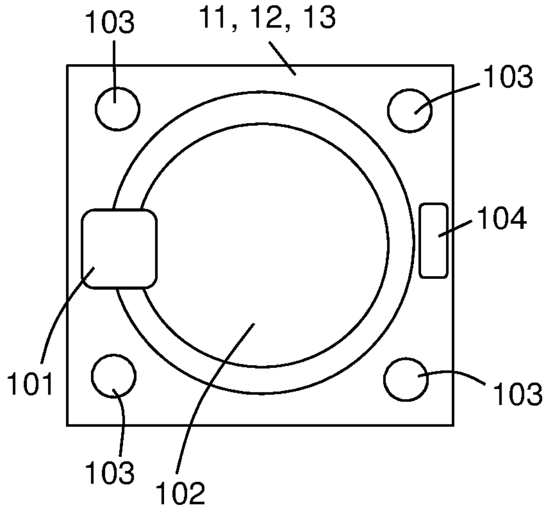
FIGS. 4A-4B illustrates a port in a closed state and an open state according to some embodiments.
Figure 4B:
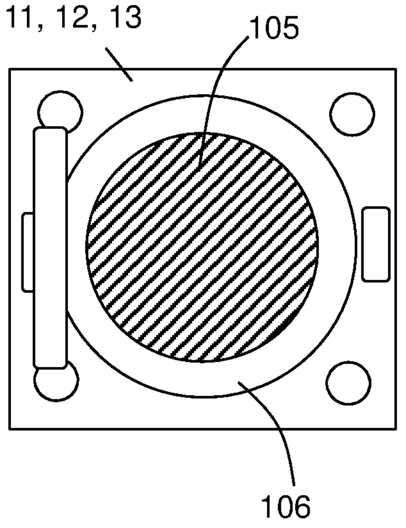

FIG. 4A illustrates an example port 11, 12, 13 in a closed state, and FIG. 4B illustrates the same port 11, 12, 13 in an open state. In the closed state, the lid 102 is closed. In the open state, the lid 102 is open and the port opening 105 is accessible. The port 11, 12, 13 comprises a port mechanism 101 arranged to selectively open and close the port 11, 12, 13. The port 11, 12, 13 for example comprises a lid 102 or a valve (not shown) configured to close the port tightly, that the port mechanism 101 is configured to actuate. In some embodiments, each port 11, 12, 13 comprises an individual port mechanism 101. The control device 200, 300 is then configured to configure the port 11, 12, 13 selected for receiving a fire extinguishing agent to the ongoing or imminent fire by controlling the port mechanism 101 to open the port 11, 12, 13. Thereby, it is possible to pass the agent into the selected port. As the port will be opened, it will also be visibly indicated which port is suitable for receiving the agent. In some embodiments, all ports 11, 12, 13 of the vehicle 1 are opened when a fire or imminent fire is detected. Then, any port may be used for receiving the agent.

To further support fast identification of the selected port 11, 12, 13, the port 11, 12, 13 comprises, in some embodiments, at least one indication device 103, 104 configured to indicate the port 11, 12, 13 visually and/or audially. The indication device 103, 104 is for example a lamp 103, e.g. a light emitting diode (LED), or a loud speaker 104. In other words, selected ports are visually or audibly highlighted. The control device 200, 300 is then configured to configure the port 11, 12, 13 selected for receiving a fire extinguishing agent to the ongoing or imminent fire by indicating with the at least one indication device 103, 104 of the selected port 11, 12, 13. Thus, the control device 200, 300 will light one or several lamps or make a sound via the loudspeaker of the selected port 11, 12, 13. The light may be flashing. In case several ports are selected, then all the selected ports will be indicated.

When a fire or imminent fire has been detected, the modular vehicle 1 wants to get help to extinguish the fire. For that purpose, in some embodiments, the control device 200, 300 is configured to send a fire alarm notification to the fire extinguishing vehicle 400 or an off-board system 100, wherein the fire alarm notification comprises information identifying the modular vehicle 1. By means of the identity of the modular vehicle 1, the fire extinguishing vehicle 400 and/or the off-board system 100 may then locate the modular vehicle 1 on a map, and the fire extinguishing vehicle 400 can drive to the modular vehicle 1 to extinguish the fire in the modular vehicle 1. The off-board system 100 may also locate the modular vehicle 1 and command the fire extinguishing vehicle 400 to drive to the modular vehicle 1. By means of the identity the type of vehicle 1 and the type of propulsion used by the vehicle 1 (battery, gas, diesel, etc.) may be determined. Alternatively, the control device 200, 300 is configured to send information of the ongoing or imminent fire and/or information indicative of a position of modular vehicle 1 to the fire extinguishing vehicle 400 or an off-board system. Thereby, the fire extinguishing vehicle 400 or an off-board system do not need to locate the modular vehicle 1 by identity, which may be convenient if not all identities are known.

When the fire extinguishing vehicle 400 has driven to the modular vehicle 1, the agent should be passed into the selected port 11, 12, 13. FIG. 5 illustrates the modular vehicle in FIG. 3, where a fire hose 410 of a fire extinguishing vehicle 400 is connected to the port 13 of the modular vehicle 1. In some embodiments, the fire extinguishing vehicle 400 locates the indicated port 11, 12, 13, automatically pulls out a fire hose 410 and attaches the fire hose interface 405 to the interface of the indicated 11, 12, 13. Alternatively, a fire fighter manually pulls the fire hose 410 and attaches the fire hose interface 405 to the indicated port 11, 12, 13. The fire hose 410 may be made of a rigid material, e.g. stainless steel or plastic, or the fire hose 410 may be made of a soft material.

The agent will be pushed via the fire hose 410 with some force. To avoid that the fire hose 410 falls off the selected port 11, 12, 13, the port may comprise a locking interface 106 for locking a fire hose interface 405 to the port 11, 12, 13. Thus, in some embodiments, each port 11, 12, 13 comprises a locking interface 106 for locking a fire hose interface 405 to the port 11, 12, 13. The locking mechanism of the locking interfaces for example uses magnetism, to temporarily lock the fire hose to the port. Thus, one of the locking interface 106 and the fire hose interface 405 is electromagnetic, and the other one of the locking interface 106 and the fire hose interface 405 is at least partly made of ferromagnetic material. In the figures, the locking interface 106 is arranged around the port opening 105. Alternatively, the locking interfaces 106 and the fire hose interface 405 may use some kind of key and key hole principle. For example, the locking interfaces 106 and the fire hose interface 405 use a locking mechanism being a quick connection or quick coupling. This kind of connection mechanism may be e.g. pressed together with force. It comprises a male part and a female part that are pushed together. For example, one of the locking interface 106 and the fire hose interface 405 comprises a female part, and the other one comprises a male part. In order to lock the quick connection, a resilient locking may be used. The resilient locking may be actuated with an actuating means, e.g. electromagnetism, pressurized air etc., which is controlled from the control device 200, 300.

The fire extinguishing vehicle 400 is for example an automated modular vehicle that comprises at least one drive module 30 and a functional module 40. The functional module 40 comprises a plurality of containers 430, 431, 432 each comprising a fire extinguishing agent being different from the agents of the other containers 430, 431, 432. By having different kinds of agents, different agents may be used to extinguish a fire or imminent fire dependent of what is on fire. An agent is for example water, foam, dry powder, chemical, carbonic acid etc. The agents from the containers 430, 431, 432 are selectively allowed to pass via a manifold 420 to the fire hose 410 by means of valves 430*a*, 431*a*, 432*a* acting on the manifold 420. Thus, the valves are arranged to selectively open and close the flow in the manifold. The manifold 420 comprises pipes or fluid lines connected to the containers 430, 431, 432. The valves 430*a*, 431*a*, 432*a* are controlled by a control device 200 of the fire extinguishing vehicle 400, that determines what agent to use based on information received from the modular vehicle 1. The agents are typically pressurized, and an agent is pressed with high pressure from a container, when the manifold 420 is open for passage from the container.

Figure 6:
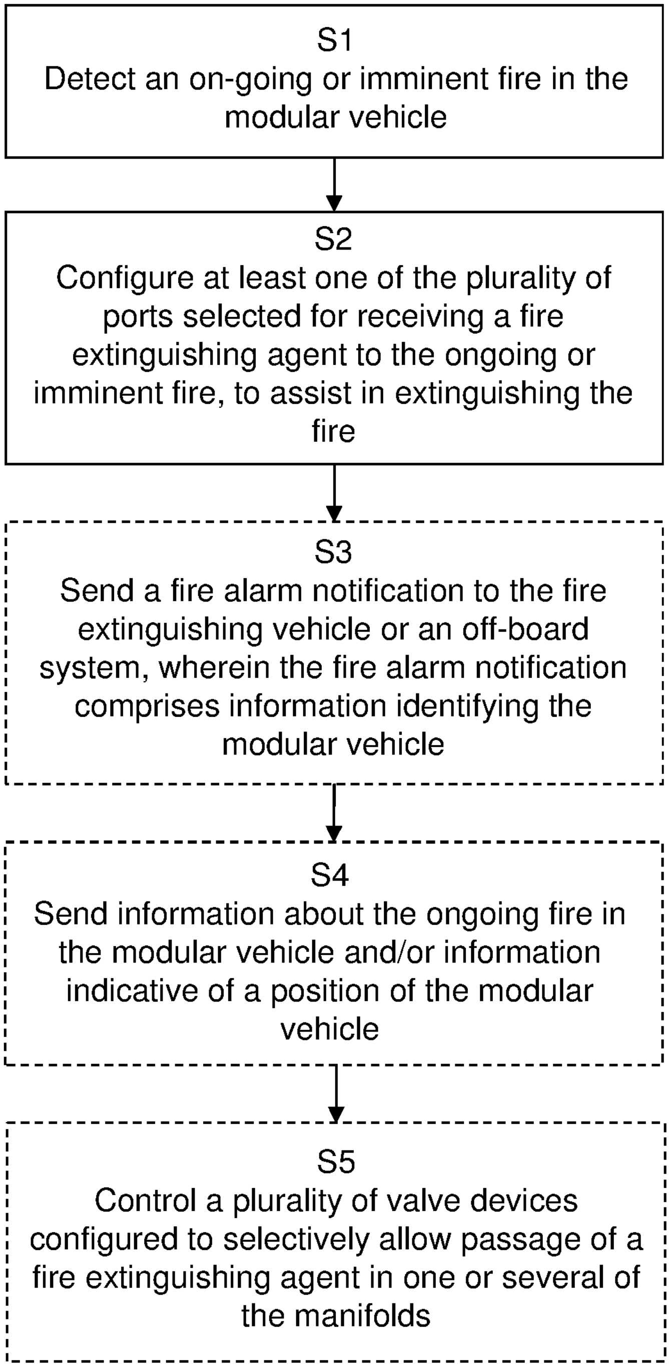
FIG. 6 illustrates a flow chart of a method according to the first aspect.

The proposed technique will now be explained with reference to the flow chart of FIG. 6, illustrating a corresponding method performed by a control device 200, 300 of the fire extinguishing vehicle 1. As previously described, this disclosure proposes, according to a second aspect, a method for assisting in extinguishing an ongoing or imminent fire in the modular vehicle, for example the modular vehicle 1 in FIGS. 1 to 3 and 5. The method may be implemented as a computer program comprising instructions which, when the program is executed by a computer (e.g. a processor in a control device 200 in drive module 30 or a control device 300 in a functional module 40), cause the computer to carry out the method. According to some embodiments the computer program is stored in a computer-readable medium (e.g. a memory or a compact disc) that comprises instructions which, when executed by a computer, cause the computer to carry out the method. The proposed method is e.g. performed in a control device 200 of a drive module 30 assigned to be a master drive module. However, it must be appreciated that the method may alternatively, at least partly, be implemented in the control devices 200, 300 of the modules of the vehicle, or the implementation may be distributed among several or all of the control devices 200, 300. The method may be performed at any time, e.g. during driving or stand still.

The method comprises detecting S1 an ongoing or imminent fire in the modular vehicle 1. The fire may be detected by means of data received from a plurality of detectors in the vehicle 1 as previously described. In some embodiments, the detecting S1 comprises detecting an ongoing or imminent fire upon at least one detected fire related property meeting one or several fire criteria. If the vehicle 1 is driving when the fire or imminent fire is detected, the vehicle 1 is typically immediately stopped and the motor(s) are turned off. The method further comprises configuring S2 at least one of the plurality of ports 11, 12, 13 selected for receiving a fire extinguishing agent to the ongoing or imminent fire, to assist in extinguishing the fire. The configuring comprises, for example, opening the selected port, and indicating or highlighting the selected port audially or visually. Hence, according to some embodiments, the configuring S2 comprises configuring the port 11, 12, 13 selected for receiving a fire extinguishing agent to the ongoing fire by controlling a port mechanism 101 to open the port 11, 12, 13. In some embodiments, the configuring S2 comprises configuring the port 11, 12, 13 selected for receiving a fire extinguishing agent to the ongoing or imminent fire by indicating with at least one indication device 103, 104 of the selected port 11, 12, 13.

The plurality of ports is arranged at different places on the vehicle 1. According to one embodiment, a first port 11 of the plurality of ports 11, 12, 13 is arranged in a first drive module 30*a* of the at least one drive modules 30. In some embodiments, a second port 12 of the plurality of ports 11, 12, 13 is arranged in a second drive module 30*b* of the at least one drive modules 30. In another embodiment, a third port 13 of the plurality of ports 11, 12, 13 is arranged in the functional module 30.

Thus, one or several of the ports are selected as being suitable for passing an agent to suppress the fire or imminent fire. A port may be selected in a plurality of ways. In one example embodiment, the detecting S1 an ongoing or imminent fire comprises determining a location in the modular vehicle 1 related to an ongoing or imminent fire. Then, the configuring S2 comprises selecting a port of the plurality of ports 11, 12, 13 for receiving a fire extinguishing agent to the ongoing fire, as being a port 11, 12, 13 that is connected to at least one manifold 61, 62, 63 that includes the shortest distance to the determined location. The selecting may be based on a scheme, saved e.g. in the control device 200, 300, of which port to select depending on where the fire is located, such that the agent could efficiently be passed to the fire or imminent fire. For example, the scheme points out which port to select based on the location in the vehicle 1 related to the fire or imminent fire, and thus points out a route for the agent to reach the fire or imminent fire. In some embodiments, the scheme comprises a plurality of alternative routes for the agent to be passed to the location of the fire or imminent fire. A port may then be selected based on different criteria, e.g. which port gives the shortest route to the fire, which port is accessible (e.g. not damaged, broken or not accessible from outside the vehicle) etc. This is possible because the manifolds connected to the different ports 11, 12, 13 are, in some embodiments, fluidly interconnected, and agent may be passed between the manifolds by means of selective actuation of valves 74. Thus, in some embodiments, the system 10 comprising a plurality of module connection ports 81, 82 arranged in the modules 30, 40 for connecting manifolds 61, 62, 63 of the individual modules 30, 40. These alternative routes may be ranked according to suitability, where the top ranked alternative is selected and the therein used port is chosen as the selected port. If however the top ranked alternative cannot be used for some reason, e.g. because it is broken due to an accident or is temporarily unavailable, the secondly ranked alternative could be used, etc., and the therein used port is put forward as the selected port. Thereby, there should always be a port that can be used, as the manifolds in the modular vehicle 1 are connected. Hence, in some embodiments, the comprises controlling S5 a plurality of valve devices 74 configured to selectively allow passage of a fire extinguishing agent in one or several of the manifolds 61, 62, 63, such that fire extinguishing agent can be passed from the port 11, 12, 13 selected for receiving a fire extinguishing agent to the location related to the ongoing fire.

In some embodiments, the method comprises sending S3 a fire alarm notification to a fire extinguishing vehicle 400 or an off-board system 100, wherein the fire alarm notification comprises information identifying the modular vehicle 1. In some embodiments, the method comprises sending S4 information about the ongoing fire in the modular vehicle 1 and/or information indicative of a position of the modular vehicle 1. This information may be sent via short-range communication such as Bluetooth or other wireless communication directly to the fire extinguishing vehicle 400.

Figure 7:
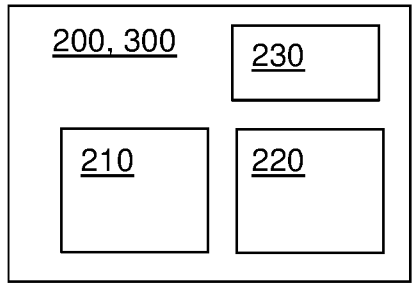
FIG. 7 illustrates an example implementation of a control device according to some embodiments.

Now turning to FIG. 7 which illustrates an example implementation a control device configured to implement the proposed method according to the third aspect. In this example the control device is embodied as a control device 200, 300 for use in a vehicle 1, such as the modular vehicle described in FIG. 1 to FIG. 5. In some embodiments, the control device 200, 300 is a “unit” in a functional sense. Hence, in some embodiments the control device 200, 300 is a control arrangement comprising several physical control devices that operate in corporation. The control device 200, 300 comprises hardware and software. The hardware basically comprises various electronic components on a Printed Circuit Board, PCB. The most important of those components is typically a processor 210 along with a memory 220.

The control device 200, 300 also comprises one or more communication interfaces 230, enabling the control device 200, 300 to communicate with other modules 30, 40 of the modular vehicle 1, or of other vehicles. The communication between the modules is as mentioned above wireless, conductive or wired. Wired communication may be implemented standard protocols such as Controller Area Network, CAN. CAN is a robust vehicle bus standard designed to allow microcontrollers and devices to communicate with each other in applications without a host computer. Wireless communication between the modules may be implemented using any short-range communication protocol such as Bluetooth or 802.11.

The one or more communication interfaces 230 is also configured to enable wireless communication with the control device 100, i.e. with the off-board system. The wireless communication between the control device 200, 300 in the vehicle and the control device 100 in the off-board system is e.g. implemented using 4G, 5G, V2V (Vehicle to Vehicle) or any other suitable wireless communication protocol.

The control device 200, 300, or more specifically the processor 210 of the control device 200, 300, is configured to cause the control device 200, 300 to perform all aspects of the method described above and below, and in particular the method according to the third aspect. Thus, the control device 200, 300 is configured for performing a method for assisting e.g. a fire extinguishing vehicle 400 in extinguishing an ongoing or imminent fire in the modular vehicle 1. This is typically done by running computer program code stored in the memory 220 in the processor 210 of the control device 200, 300. Thus, the computer program comprises instructions which, when the program is executed by a control device, cause the control device to carry out the method according to any one of the embodiments as described herein. The program may be stored on a computer-readable storage medium comprising instructions which, when executed by a control device, cause the control device to carry out the method according to any one of the embodiments as described herein.

The invention claimed is:

1. A fire extinguishing assistance system, arranged in a modular vehicle, for assisting in extinguishing an ongoing or imminent fire in the modular vehicle, wherein the modular vehicle comprises at least one drive module and a functional module that are releasably connected, wherein the fire extinguishing assistance system comprises:

a plurality of ports accessible from the outside of the modular vehicle;

wherein each port is configured for receiving a fire extinguishing agent;

an individual manifold connected to each port, wherein each individual manifold is arranged to guide the fire extinguishing agent received via the port and further to at least one nozzle directed in the inside of the modular vehicle; and one or more control devices configured to individually or collectively:

detect an ongoing or imminent fire in the vehicle; and configure at least one of the plurality of ports selected for receiving a fire extinguishing agent to the ongoing or imminent fire, to assist in extinguishing the ongoing or imminent fire.

2. The system according to claim 1, wherein a first port of the plurality of ports is arranged in a first drive module of the at least one drive module.

3. The system according to claim 2, wherein a second port of the plurality of ports is arranged in a second drive module of the at least one drive module.

4. The system according to claim 3, wherein a third port of the plurality of ports is arranged in the functional module.

5. The system according to claim 1, wherein the one or more control devices is configured to detect an ongoing or imminent fire upon at least one detected fire related property meeting one or several fire criteria.

6. The system according to claim 5, wherein the—at least one detected—fire-related properties is one or several of: heat, smoke, smoke particles and/or gas.

7. The system according to claim 1, wherein the one or more control devices is configured to determine a location in the vehicle related to the ongoing or imminent fire, and to select a port of the plurality of ports for receiving a fire extinguishing agent to the ongoing or imminent fire, as being a port that is connected to at least one of the manifolds that includes the shortest distance to the determined location.

8. The system according to claim 7, comprising a plurality of valve devices configured to selectively allow passage of a fire extinguishing agent in one or several of the manifolds, and wherein the one or more control devices is configured to control the plurality of valve devices such that the fire extinguishing agent can be passed from the port selected for receiving a fire extinguishing agent, to the location related to the ongoing or imminent fire.

9. The system according to claim 1, comprising a plurality of module connection ports arranged in the modules for interconnecting the manifolds.

10. The system according to claim 1, wherein each port comprises a port mechanism arranged to selectively open and close the port, and wherein the one or more control devices is configured to configure the port selected for receiving a fire extinguishing agent to the ongoing or imminent fire by controlling the port mechanism to open the port.

11. The system according to claim 1, wherein each port comprises at least one indication device configured to indicate the port visually and/or audially, wherein the one or more control devices is configured to configure the port selected for receiving a fire extinguishing agent to the ongoing or imminent fire by indicating with the at least one indication device of said port.

12. The system according to claim 1, wherein each port comprises a locking interface for locking a fire hose interface to the port.

13. The system according to claim 1, wherein the at least one nozzle is directed to: an energy storage, an electric motor and/or a braking system.

14. The system according to claim 1, wherein the one or more control devices is configured to send a fire alarm notification to a fire extinguishing vehicle or an off-board system, wherein the fire alarm notification comprises information identifying the modular vehicle.

15. The system according to claim 1, wherein the one or more control devices is configured to send information of the ongoing or imminent fire and/or information indicative of a position of the modular vehicle to a fire extinguishing vehicle or an off-board system.

16. A modular vehicle comprising:

at least one driving module;

a functional module that is releasably connected to the at least one driving module; and a fire extinguishing assistance system for assisting in extinguishing an ongoing or imminent fire in the modular vehicle, wherein the fire extinguishing assistance system comprises:

a plurality of ports accessible from the outside of the modular vehicle; wherein each port is configured for receiving a fire extinguishing agent;

an individual manifold connected to each port, wherein each individual manifold is arranged to guide the fire extinguishing agent received via the port and further to at least one nozzle directed in the inside of the modular vehicle; and one or more control devices configured to individually or collectively:

detect an ongoing or imminent fire in the vehicle; and configure at least one of the plurality of ports selected for receiving a fire extinguishing agent to the ongoing or imminent fire, to assist in extinguishing the ongoing or imminent fire.

17. A method, performed in a modular vehicle, for assisting in extinguishing an ongoing or imminent fire in the modular vehicle, wherein the modular vehicle comprises at least one drive module and a functional module that are releasably connected, and a fire extinguishing assistance system comprising: a plurality of ports accessible from the outside of the modular vehicle; wherein each port is configured for receiving a fire extinguishing agent; and an individual manifold connected to each port, wherein each individual manifold is arranged to guide the fire extinguishing agent received via the port and further to at least one nozzle directed in the inside of the modular vehicle; wherein the method comprises:

detecting an ongoing or imminent fire in the vehicle; and configuring at least one of the plurality of ports selected for receiving a fire extinguishing agent to the ongoing or imminent fire, to assist in extinguishing the ongoing or imminent fire.

18. The method according to claim 17, wherein the detecting comprises detecting an ongoing or imminent fire upon at least one detected fire related property meeting one or several fire criteria.

19. The method according to claim 17, wherein the detecting an ongoing or imminent fire comprises determining a location in the modular vehicle related to the ongoing or imminent fire, and wherein the configuring comprises selecting a port of the plurality of ports for receiving a fire extinguishing agent to the ongoing or imminent fire, as being a port that is connected to at least one of the manifolds that includes the shortest distance to the determined location.

20. The method according to claim 19, wherein the method comprises controlling a plurality of valve devices configured to selectively allow passage of a fire extinguishing agent in one or several of the manifolds, such that the fire extinguishing agent can be passed from the port selected for receiving a fire extinguishing agent to the location related to the ongoing or imminent fire.

21. The method according to claim 17, wherein the configuring comprises configuring the port selected for receiving a fire extinguishing agent to the ongoing or imminent fire by controlling a port mechanism to open the port.

22. The method according to claim 17, wherein the configuring comprises configuring the port selected for receiving a fire extinguishing agent to the ongoing or imminent fire by indicating with at least one indication device of said port.

23. The method according to claim 17, wherein the method comprises sending a fire alarm notification to a fire extinguishing vehicle or an off-board system, wherein the fire alarm notification comprises information identifying the modular vehicle.

24. The method according to claim 17, wherein the method comprises sending information about the ongoing or imminent fire in the modular vehicle and/or information indicative of a position of the modular vehicle to a fire extinguishing vehicle or an off-board system.

25. A computer program product comprising computer program code stored on a non-transitory computer-readable medium, said computer program product used for assisting in extinguishing an ongoing or imminent fire in a modular vehicle, wherein the modular vehicle comprises at least one drive module and a functional module that are releasably connected, and a fire extinguishing assistance system comprising: a plurality of ports accessible from the outside of the modular vehicle; wherein each port is configured for receiving a fire extinguishing agent; and an individual manifold connected to each port, wherein each individual manifold is arranged to guide the fire extinguishing agent received via the port and further to at least one nozzle directed in the inside of the modular vehicle, said computer program code comprising computer instructions to cause one or more control units to perform the following operations:

detecting an ongoing or imminent fire in the vehicle; and configuring at least one of the plurality of ports selected for receiving a fire extinguishing agent to the ongoing or imminent fire, to assist in extinguishing the ongoing or imminent fire.

26. The system according to claim 1, wherein the one or more control devices is a general electronic processor performing operations by running computer program code stored on a non-transitory computer-readable medium associated with the one or more control devices.

* * * * *